United States Patent
Ruthemeyer et al.

(10) Patent No.: US 10,221,712 B2
(45) Date of Patent: Mar. 5, 2019

(54) SEAL FOR HARDWARE SEGMENTS (71) Applicant: General Electric Company, Schenectady, NY (US)

(72) Inventors: Michael Anthony Ruthemeyer, Cincinnati, OH (US); David Alan Frey, West Chester, OH (US)

(73) Assignee: General Electric Company, Schenectady, NY (US)

( * ) Notice: Subject to any disclaimer, the term of this patent is extended or adjusted under 35 U.S.C. 154(b) by 212 days.

(21) Appl. No.: 15/155,115

(22) Filed: May 16, 2016

(65) Prior Publication Data
US 2017/0328228 A1 Nov. 16, 2017

(51) Int. Cl.
F02C 3/04 (2006.01)
F01D 11/00 (2006.01)
F01D 9/04 (2006.01)
F01D 5/22 (2006.01)
F01D 9/00 (2006.01)

(52) U.S. Cl.
CPC ............ *F01D 11/005* (2013.01); *F01D 5/225* (2013.01); *F01D 9/00* (2013.01); *F01D 9/04* (2013.01); *F01D 11/00* (2013.01); *F02C 3/04* (2013.01); *F05D 2220/32* (2013.01); *F05D 2240/11* (2013.01); *F05D 2240/55* (2013.01)

(58) Field of Classification Search
CPC ........ F01D 11/00; F01D 11/005; F01D 5/225; F01D 9/00; F01D 9/04; F02C 3/04; F05D 2220/32; F05D 2240/11; F05D 2240/55
See application file for complete search history.

(56) References Cited

U.S. PATENT DOCUMENTS

| | | | |
|---|---|---|---|
| 5,154,577 A | | 10/1992 | Kellock et al. |
| 5,318,402 A | * | 6/1994 | Bailey ................... F01D 11/005 415/139 |
| 5,655,876 A | | 8/1997 | Rock et al. |
| (Continued) | | | |

FOREIGN PATENT DOCUMENTS

EP 1 431 515 A2 6/2004

OTHER PUBLICATIONS

International Search Report and Written Opinion issued in connection with corresponding PCT Application No. PCT/US2017/027517 dated Sep. 27, 2017.

*Primary Examiner* — Jesse Bogue
(74) *Attorney, Agent, or Firm* — General Electric Company; William Scott Andes (57) ABSTRACT

The present disclosure is directed to a shroud assembly for a gas turbine engine that includes a first shroud segment, a second shroud segment spaced from the first shroud segment, and a third shroud segment spaced from the first shroud segment. The first and the second shroud segments define a gap therebetween, and the first and the third shroud segments define a gap therebetween. A first seal portion is positioned at least partially on the first and the third shroud segments and at least partially covers the gap defined by the first and the third shroud segments. A second seal portion is positioned at least partially on the first and the second shroud segments and at least partially covers the gap defined by the first and the second shroud segments. A third seal portion extends between and couples the first and the second seal portions.

20 Claims, 7 Drawing Sheets

(56) References Cited

U.S. PATENT DOCUMENTS

| | | | | |
|---|---|---|---|---|
| 5,738,490 | A * | 4/1998 | Pizzi | F01D 11/005 415/139 |
| 5,988,975 | A * | 11/1999 | Pizzi | F01D 11/005 415/139 |
| 6,162,014 | A | 12/2000 | Bagepalli et al. | |
| 6,503,051 | B2 | 1/2003 | Predmore | |
| 7,090,224 | B2 | 8/2006 | Iguchi et al. | |
| 7,575,415 | B2 | 8/2009 | Drerup et al. | |
| 7,625,174 | B2 | 12/2009 | Drerup et al. | |
| 9,850,775 | B2 * | 12/2017 | Pietrobon | F01D 11/08 |
| 9,938,846 | B2 * | 4/2018 | Freeman | F01D 11/005 |
| 9,945,256 | B2 * | 4/2018 | Freeman | F01D 25/246 |
| 2009/0079139 | A1 | 3/2009 | Schiavo et al. | |

\* cited by examiner

SEAL FOR HARDWARE SEGMENTS

FIELD OF THE INVENTION

The present disclosure relates to a gas turbine engine. More specifically, the present disclosure relates to seal for use in a gas turbine engine.

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the turbine section includes, in serial flow order, a high pressure turbine and a low pressure turbine. The high pressure and the low pressure turbines each include one or more rows of turbine blades, which extract kinetic energy and/or thermal energy from the combustion gases flowing therethrough. A turbine shroud typically forms a ring or enclosure around each row of turbine blades. That is, each turbine shroud is positioned radially outwardly from and circumferentially encloses each corresponding row of turbine blades.

Typically, each turbine shroud is formed from a plurality of shroud segments, which are assembled to form the ring that circumferentially encloses the corresponding row of turbine rotor blades. In this respect, gaps may exist between each of the shroud segments. These gaps may permit a portion of the combustion gases to escape therebetween, which may reduce the efficiency of the gas turbine engine. Accordingly, a seal that reduces the amount of combustion gases escaping through gaps between adjacent shroud segments would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a shroud assembly for a gas turbine engine that defines a circumferential direction C. The shroud assembly includes a first shroud segment that extends between a first end and a second end along the circumferential direction C. A second shroud segment is spaced from the first shroud segment along the circumferential direction C and defines a gap with the first end of the first shroud segment. A third shroud segment is spaced from the first shroud segment along the circumferential direction C and defines a gap with the second end of the first shroud segment. The shroud assembly also includes a seal having a first seal portion positioned at least partially on the first shroud segment and the third shroud segment and at least partially covering the gap defined by the first shroud segment and the third shroud segment. A second seal portion is positioned at least partially on the first shroud segment and the second shroud segment and at least partially covers the gap defined between the first shroud segment and the second shroud segment. A third seal portion extends between and couples the first seal portion and the second seal portion.

A further embodiment of the present disclosure is directed to a gas turbine engine that defines a circumferential direction C. The gas turbine engine includes a compressor section, a combustion section, and a turbine section. A first shroud segment extends between a first end and a second end along the circumferential direction C. A second shroud segment is spaced from the first shroud segment along the circumferential direction C and defines a gap with the second end of the first shroud segment. A third shroud segment is spaced from the first shroud segment along the circumferential direction C and defines a gap with the first end of the first shroud segment. The gas turbine engine also includes a seal having a first seal portion positioned at least partially on the first shroud segment and the third shroud segment and at least partially covering the gap defined by the first shroud segment and the third shroud segment. A second seal portion is positioned at least partially on the first shroud segment and second shroud segment and at least partially covers the gap defined between the first shroud segment and the second shroud segment. A third seal portion extends between and couples the first seal portion and the second seal portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
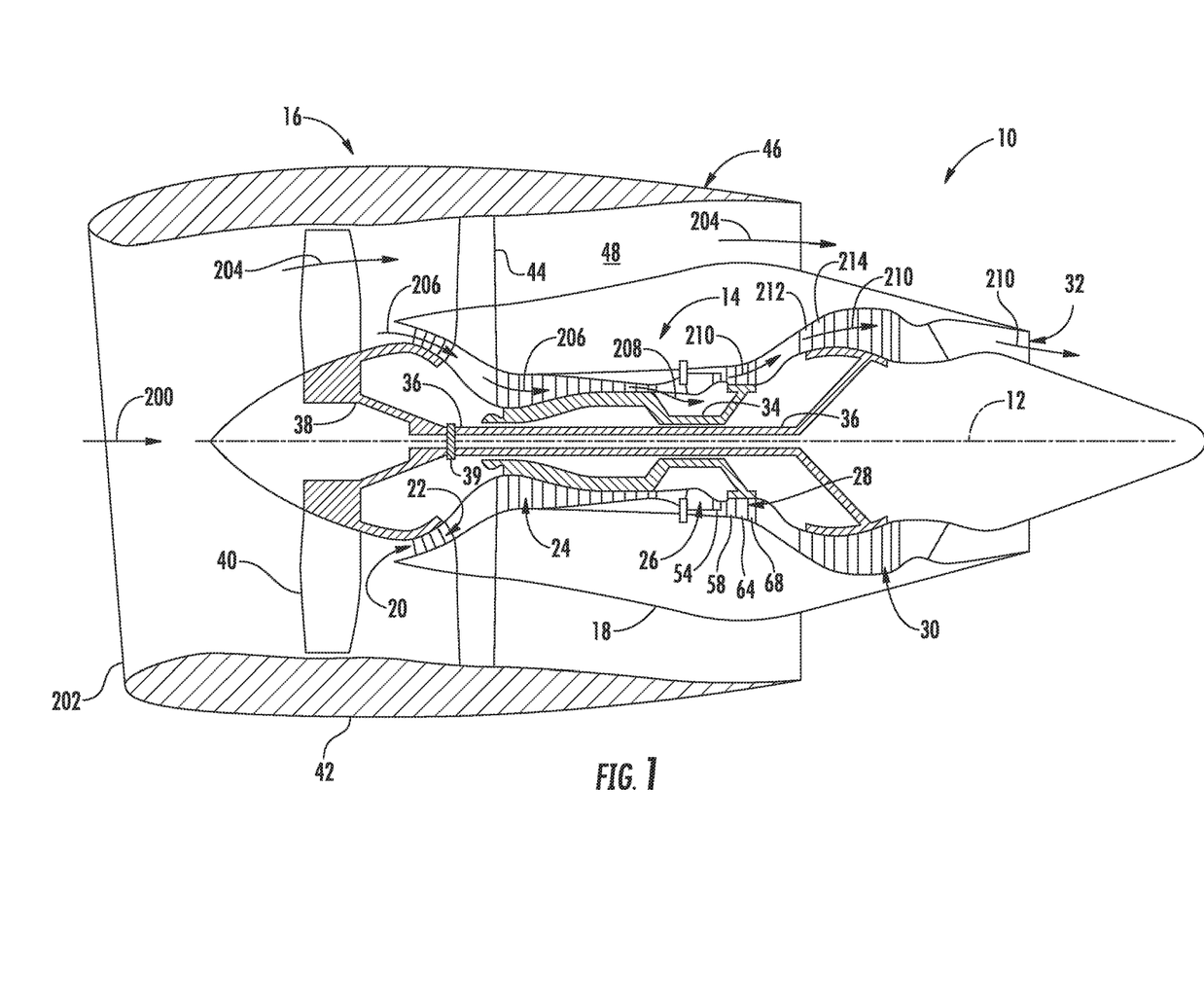
FIG. 1 is a schematic cross-sectional view of an exemplary high bypass turbofan jet engine in accordance with the embodiments disclosed herein.

Referring now to the drawings, wherein identical numerals indicate the same elements throughout the figures, FIG. 1 is a schematic cross-sectional view of an exemplary high bypass turbofan type gas turbine engine 10 ("turbofan 10"), which may incorporate various embodiments of the present disclosure. As shown in FIG. 1, the turbofan 10 has a longitudinal or axial centerline axis 12 extending therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure compressor 22 ("LP compressor 22") and a high pressure compressor 24 ("HP compressor 24"), a combustor 26, a turbine section having a high pressure turbine 28 ("HP turbine 28") and a low pressure turbine 30 ("LP turbine 30"), and a jet exhaust nozzle section 32. A high pressure shaft or spool 34 ("HP spool 34") drivingly connects the HP turbine 28 to the HP compressor 24. A low pressure shaft or spool 36 ("LP spool 36") drivingly connects the LP turbine 30 to the LP compressor 22. The LP spool 36 may also connect to a fan spool or shaft 38 ("fan spool 38") of the fan section 16. In particular embodiments, as shown in FIG. 1, the LP spool 36 may connect directly to the fan spool 38, such as in a direct-drive configuration. In alternative configurations, the LP spool 36 may connect to the fan spool 38 via a reduction gear 39, such as in an indirect-drive or geared-drive configuration.

As shown in FIG. 1, the fan section 16 includes a plurality of fan blades 40 coupled to and extending radially outwardly from the fan spool 38. An annular fan casing or nacelle 42 circumferentially surrounds the fan section 16 and/or at least a portion of the gas turbine engine 14. The nacelle 42 may be supported relative to the gas turbine engine 14 by a plurality of circumferentially-spaced outlet guide vanes 44. Moreover, a downstream section 46 of the nacelle 42 may extend over an outer portion of the gas turbine engine 14 to define a bypass airflow passage 48 therebetween.

Figure 2:
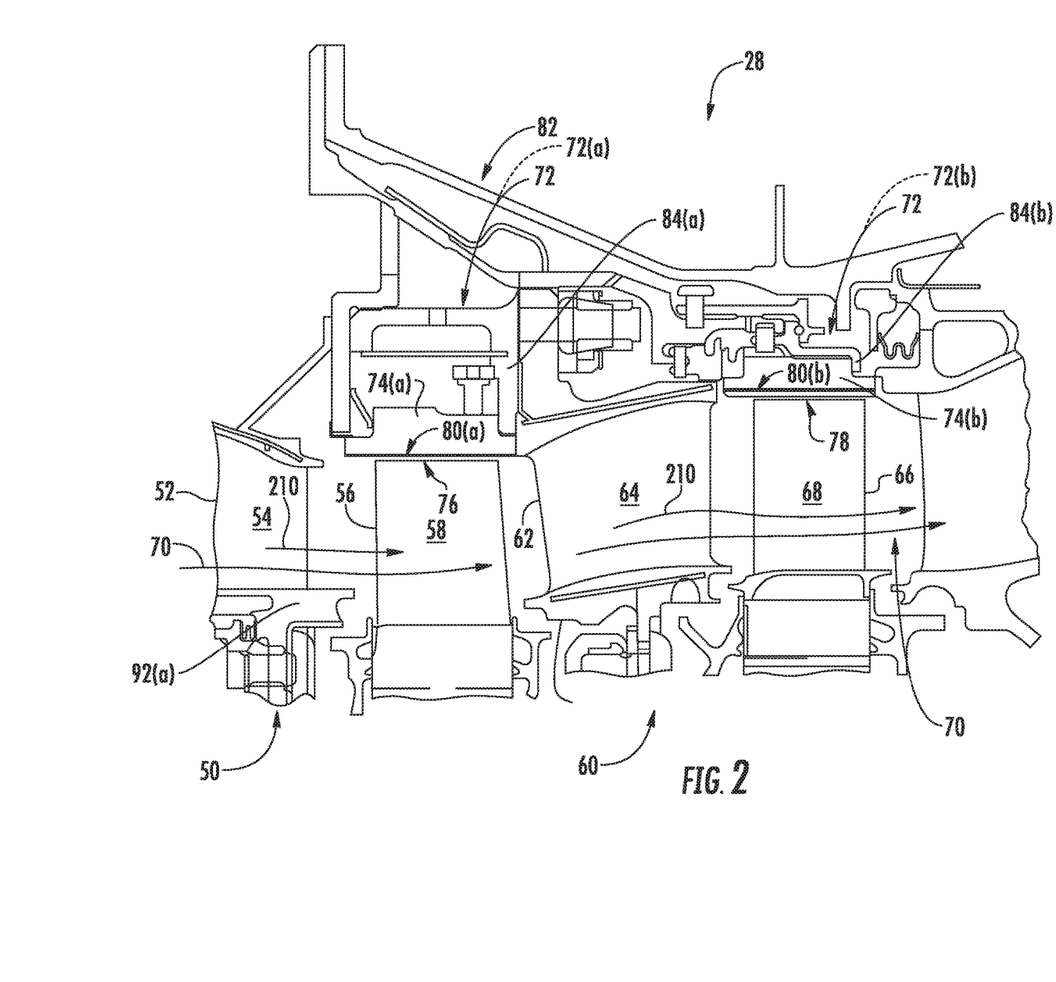
FIG. 2 is a cross-sectional side view of a high pressure turbine portion of the gas turbine engine shown in FIG. 1, illustrating the location of a shroud assembly therein.

FIG. 2 is a cross-sectional view of the HP turbine 28 portion of the gas turbine engine 14 as shown in FIG. 1, which may incorporate various embodiments disclosed herein. As shown in FIG. 2, the HP turbine 28 includes, in serial flow relationship, a first stage 50 having a row 52 of one or more stator vanes 54 (only one shown) axially spaced apart from a row 56 of one or more turbine rotor blades 58 (only one shown). The HP turbine 28 further includes a second stage 60 having a row 62 of one or more stator vanes 64 (only one shown) axially spaced apart from a row 66 of one or more turbine rotor blades 68 (only one shown).

The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustor 26 (FIG. 1) through the HP turbine 28. As shown in FIG. 1, the rows 52, 62 of the stator vanes 54, 64 are circumferentially spaced around the HP spool 34 and the rows 56, 66 of the turbine rotor blades 58, 68 are circumferentially spaced around the HP spool 34.

As shown in FIG. 2, various embodiments of the HP turbine 28 include at least one turbine shroud 72. For example, the HP turbine 28 may include a first turbine shroud 72(a) and a second turbine shroud 72(b). Each turbine shroud 72(a), 72(b) generally forms a ring or shroud around the corresponding row 56, 66 of turbine rotor blades 58, 68.

Each turbine shroud 72(a), 72(b) may radially be spaced apart from one or more corresponding blade tips 76, 78 of the turbine rotor blades 58, 68. One or more pins (not shown) may couple each turbine shroud 72(a), 72(b) to a corresponding turbine shroud mount 84(a), 84(b). The turbine shroud mount 84(a), 84(b) may connect to a casing 82 of the turbofan 10.

This arrangement forms clearance gaps between the blade tips 76, 78 and sealing surfaces or hot side surfaces 80(a), 80(b). As mentioned above, it is generally desirable to minimize the clearance gap between the blade tips 76, 78 and the turbine shrouds 74(a), 74(b), particularly during cruise operation of the turbofan 10, to reduce leakage from the hot gas path 70 over the blade tips 76, 78 and through the clearance gaps. In particular embodiments, at least one of the turbine shrouds 74(a), 74(b) may be formed as a continuous, unitary, or seamless ring.

As illustrated in FIG. 1, air 200 enters an inlet portion 202 of the turbofan 10 during operation thereof. A first portion 204 of the air 200 flows into the bypass flow passage 48, and a second portion 206 of the air 200 enters the inlet 20 of the LP compressor 22. The LP compressor 22 progressively compresses the second portion of air 206 flowing therethrough en route to the HP compressor 24. The HP compressor 24 further compresses the second portion of the air 206 flowing therethrough 24, thus providing compressed air 208 to the combustor 26 where it mixes with fuel and burns to provide combustion gases 210.

The combustion gases 210 flow through the HP turbine 28 where the stator vanes 54, 64 and turbine rotor blades 58, 68 extract a first portion of kinetic and/or thermal energy from the combustion gases 210. This energy extraction supports operation of the HP compressor 24. The combustion gases 210 then flow through the LP turbine 30 where sequential stages of LP turbine stator vanes 212 and LP turbine rotor blades 214 coupled to the LP spool 36 extract a second portion of thermal and/or kinetic energy from the combustion gases 210. This energy extraction causes the LP spool 36 to rotate, thereby supporting operation of the LP compressor 22 and/or rotation of the fan spool 38. The combustion gases 210 then flow through the jet exhaust nozzle section 32 of the gas turbine engine 14.

Along with the turbofan 10, the core turbine 14 serves a similar purpose and sees a similar environment in land-based gas turbines, turbojet engines in which the ratio of the first portion of air 204 to the second portion of air 206 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP spool 36 and the fan spool 38 of the fan section 16.

Figure 3:
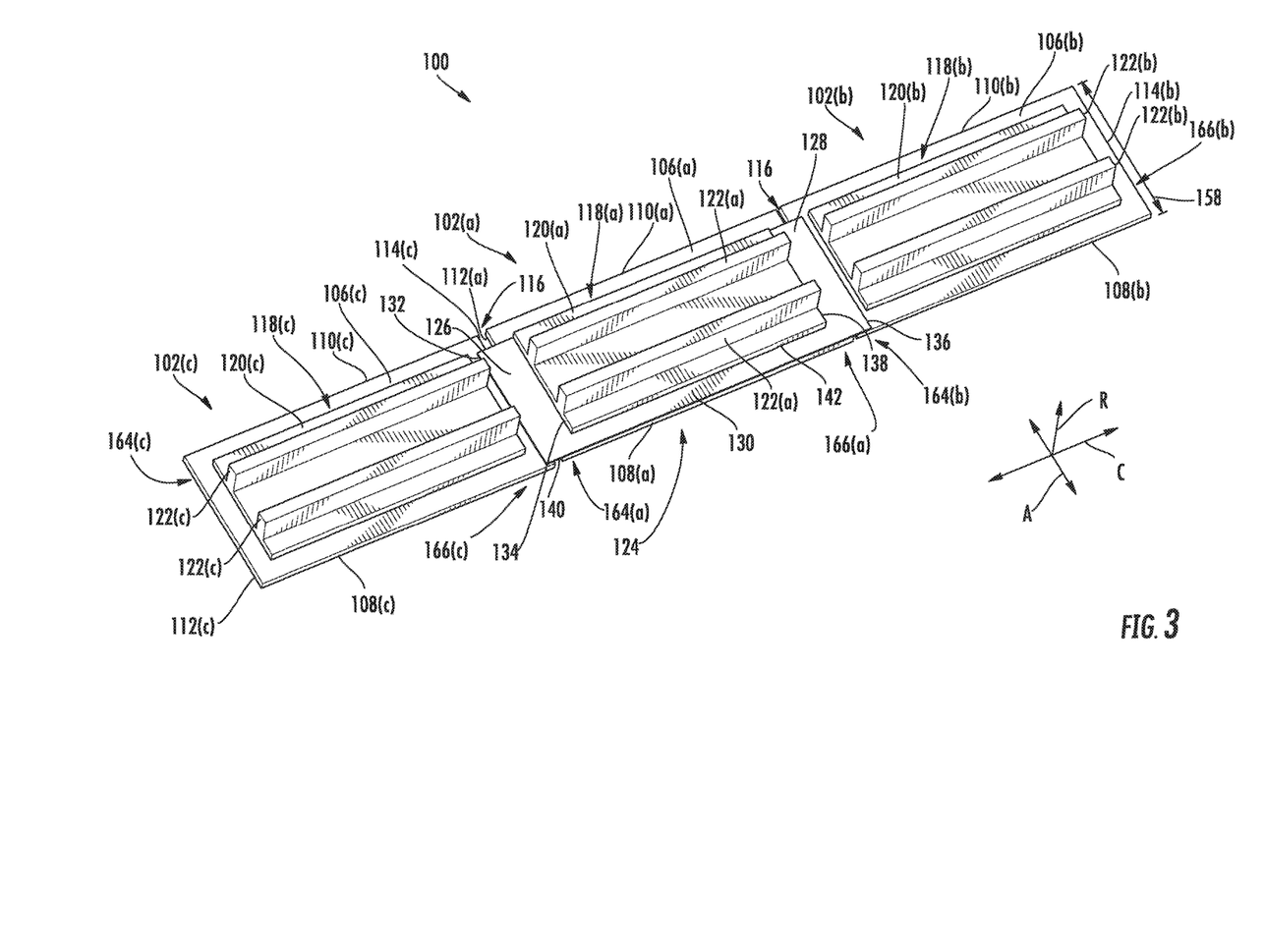
FIG. 3 is a perspective view of one embodiment of the shroud assembly as disclosed herein.
Figure 4:
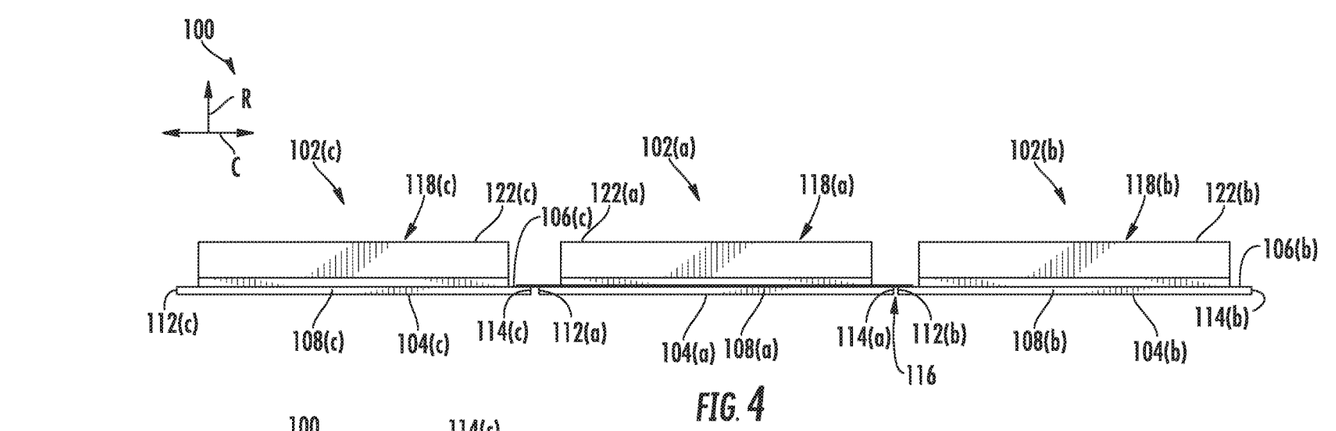
FIG. 4 is a side view of the embodiment of the shroud assembly shown in FIG. 3, illustrating one embodiment of a seal positioned therein.
Figure 5:
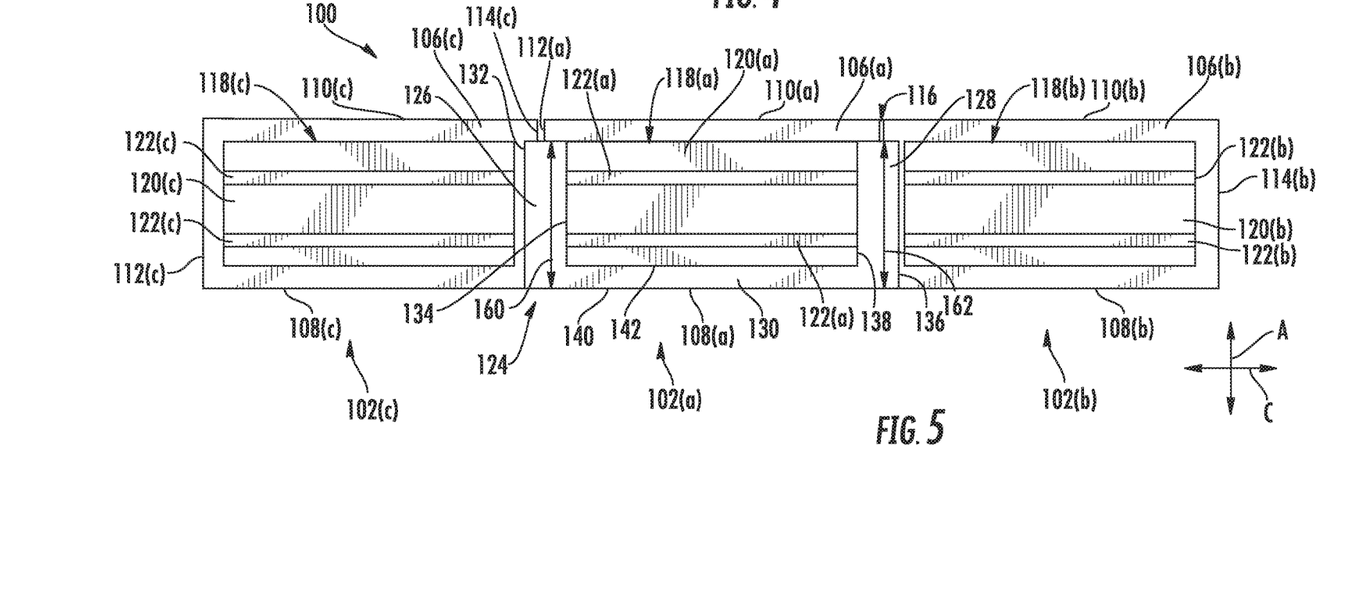
FIG. 5 is a top view of the embodiment of the shroud assembly shown in FIGS. 3 and 4, further illustrating the seal positioned therein.
Figure 6:
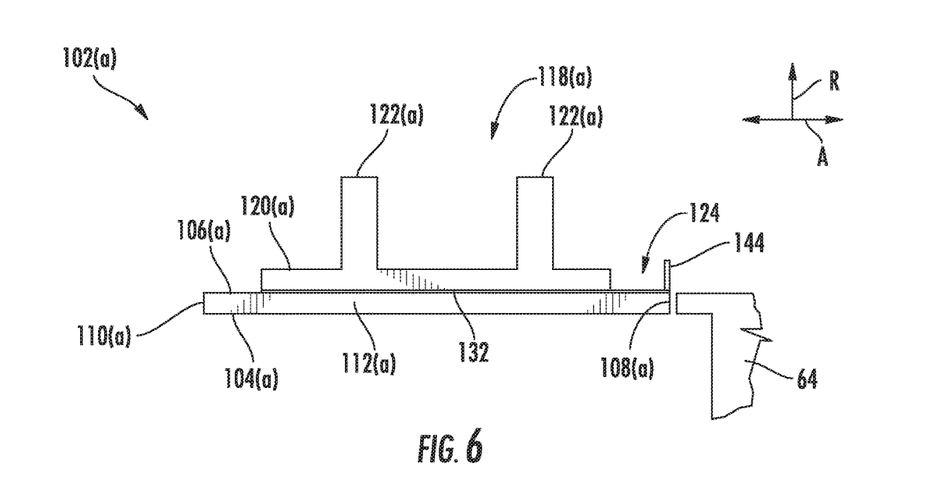
FIG. 6 is a front view of the assembly shown in FIGS. 3-5, illustrating one embodiment of the positioning of the seal relative to an adjacent stator vane.
Figure 7:
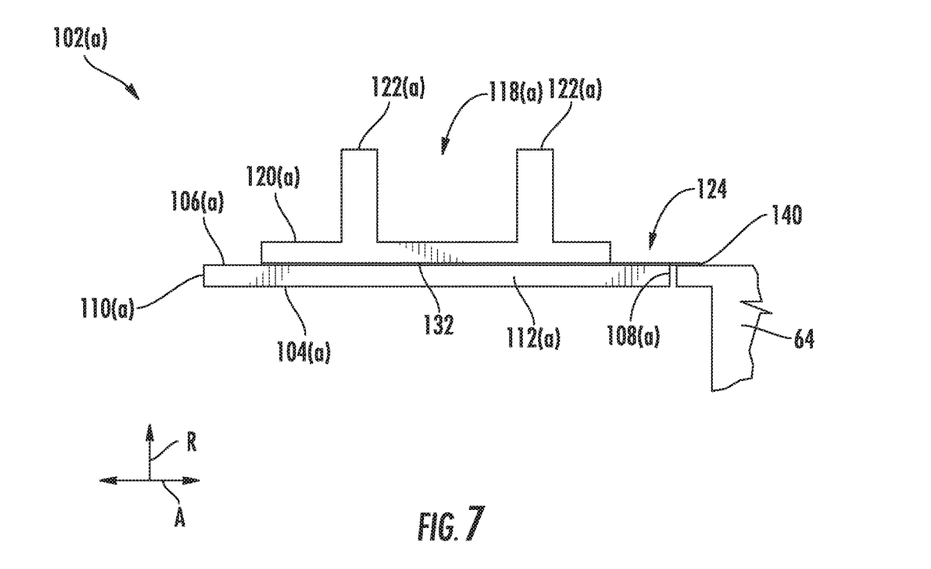
FIG. 7 is a front view of the assembly similar to FIG. 6, illustrating another embodiment of the positioning of the seal relative to the adjacent stator vane.
Figure 8:
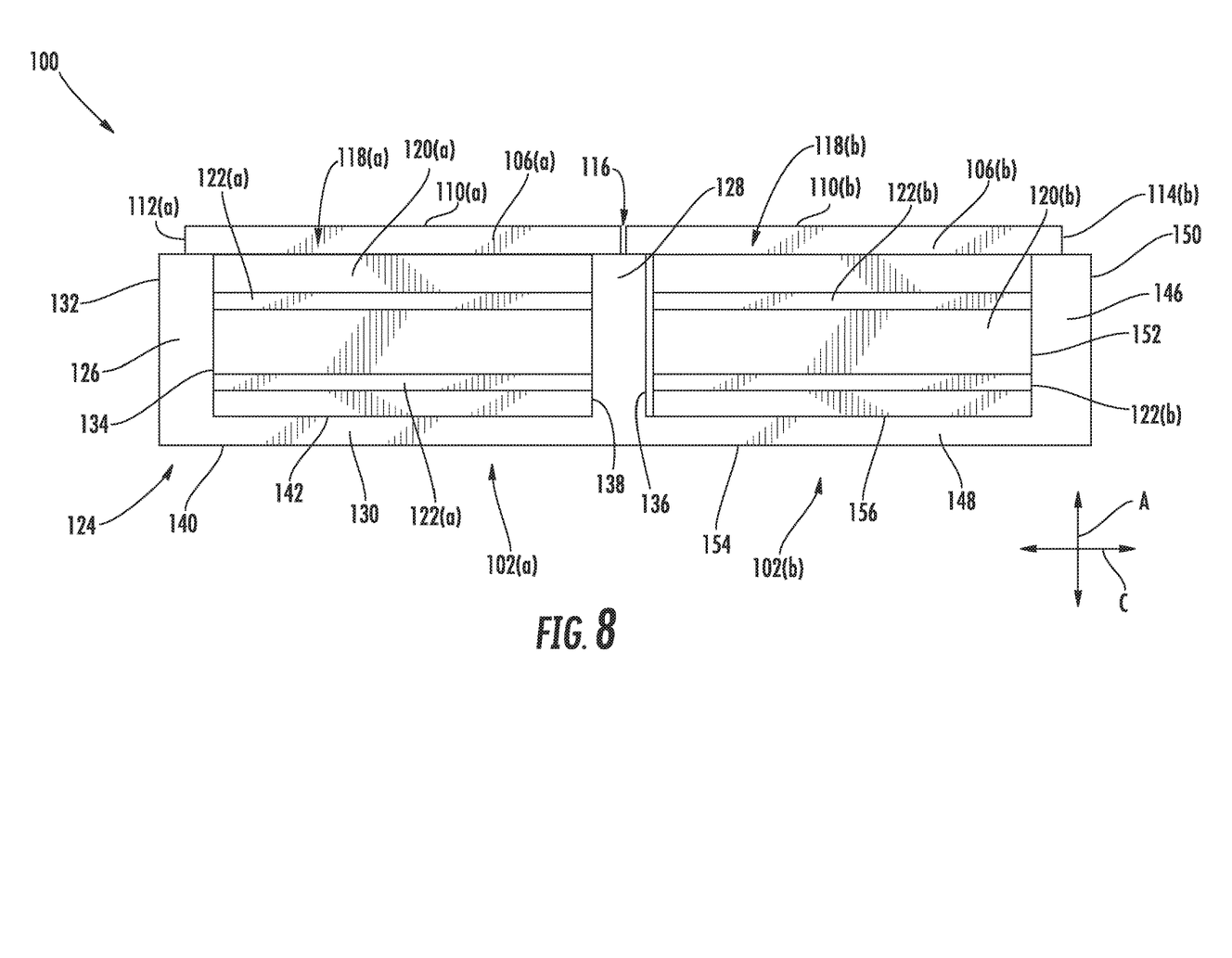
FIG. 8 is a top view of the shroud assembly, illustrating an alternate embodiment of the seal.
Figure 9:
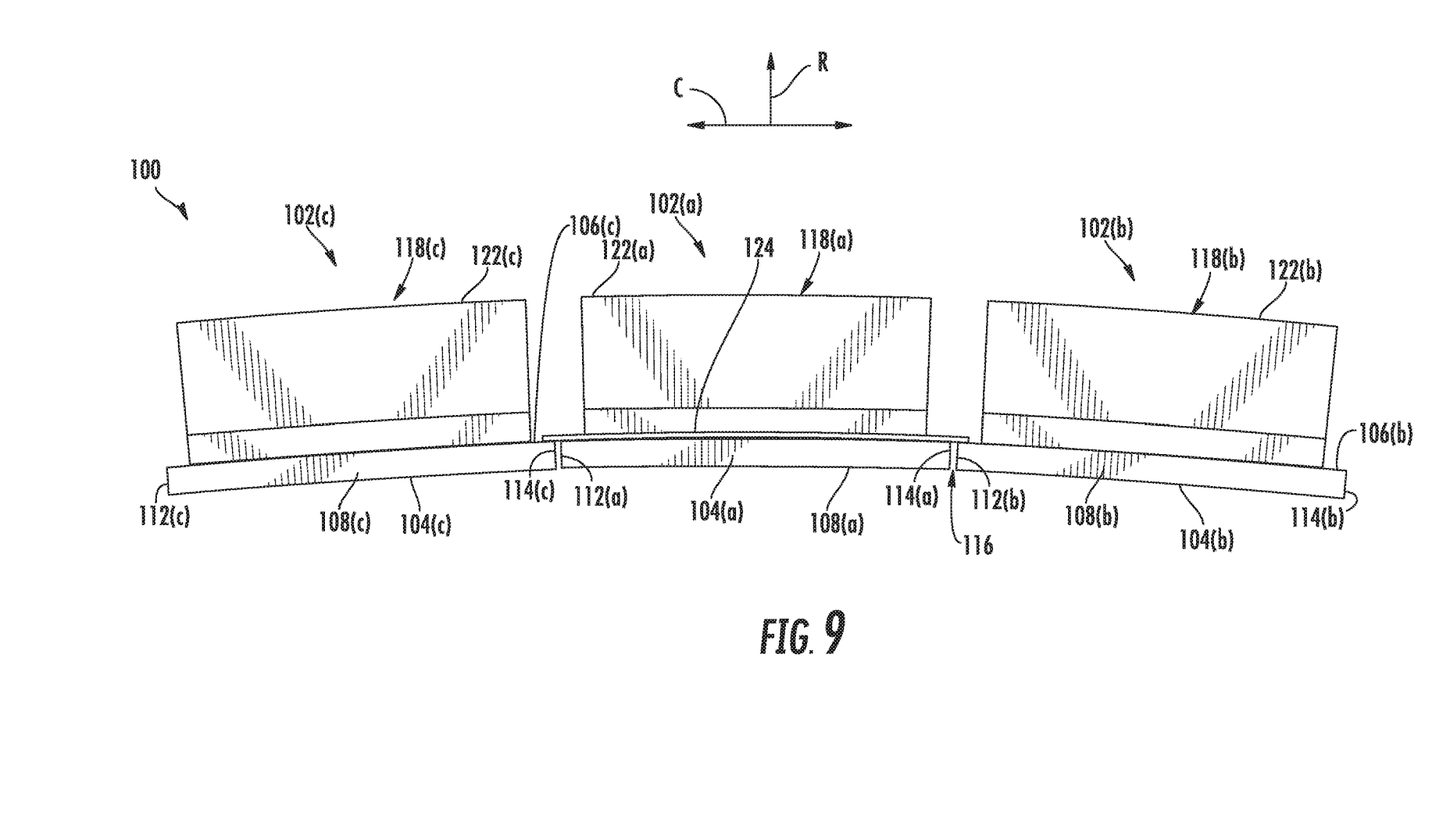
FIG. 9 is a side view of shroud assembly, illustrating an alternate embodiment of the seal positioned therein.

FIGS. 3-8 illustrate the various features of a shroud assembly 100. More specifically, FIG. 3 is a perspective view of the shroud assembly 100 in accordance with the embodiments disclosed herein. FIGS. 4 and 5 respectively are side and top views of the shroud assembly 100, illustrating one embodiment of a seal 124. FIGS. 6 and 7 are front views of the shroud assembly 100, illustrating the positioning of the seal 124 relative to the stator vane 64 or other adjacent hardware. FIG. 8 is a perspective view of the shroud assembly 100, illustrating an alternate embodiment of the seal 124. FIG. 9 is a side view of the shroud assembly, illustrating an alternate embodiment of the seal 124.

As illustrated in FIGS. 3-8, the shroud assembly 100 defines an axial direction A, a radial direction R, and a circumferential direction C. In general, the axial direction A extends along the longitudinal axis 12 of the turbofan 10 (FIG. 1), the radial direction R extends orthogonally outward from the longitudinal axis 12, and the circumferential direction C extends concentrically around the longitudinal axis 12.

The shroud assembly 100 may correspond with or be installed in place of any of the shrouds 74(*a*), 74(*b*). Accordingly, the shroud assembly 100 may be incorporated into the HP turbine 28 shown in FIG. 2.

Referring now particularly to FIG. 3, the shroud assembly 100 includes a first shroud segment 102(*a*), second shroud segment 102(*b*), and a third shroud segment 102(*c*). The first, second, and third shroud segments 102(*a*), 102(*b*), 102(*c*) are aligned along the axial direction A and the radial direction R and spaced apart along the circumferential direction C by gaps 116. More particularly, the first shroud segment 102(*a*) extends between a first end 164(*a*) and a second end 166(*a*) along the circumferential direction C. The second shroud segment defines a gap 116 with the second end 166(*a*) of the first shroud segment 102(*a*), and the third shroud segment 102(*c*) defines a gap 116 with the first end 164(*a*) of the first shroud segment 102(*a*). Although only three shroud segments 102(*a*), 102(*b*), 102(*c*) are shown in FIG. 3, the shroud assembly 100 may include more or less shroud segments as is necessary or desired. Any additional shroud segments are arranged in the same manner as the first, second, and third shroud segments 102(*a*), 102(*b*), 102(*c*).

FIGS. 3-5 illustrate the various features of the first shroud segment 102(*a*). More specifically, the first shroud segment 102(*a*) includes a radially outer surface 106(*a*) and a radially inner surface 104(*a*) spaced apart from the radially outer surface 106(*a*). The radially inner surface 104(*a*) is exposed to the combustion gases 210 if the shroud is positioned in the HP turbine 28 or the LP turbine 30 and is, accordingly, a flow side surface. Conversely, the radially outer surface 106(*a*) is not exposed to the combustion gases 210. In this respect, the radially outer surface 102 is a non-flow side surface. The radially inner surface 104(*a*) may be curved or planar in the circumferential direction C. The first shroud segment 102(*a*) also includes a first axial surface 108(*a*) and a second axial surface 110(*a*) spaced apart from the first circumferential surface 108(*a*). Furthermore, the first shroud segment 102(*a*) includes at the first end 164(*a*) a first circumferential surface 112(*a*) and at the second end 166(*a*) a second circumferential surface 114(*a*) spaced apart from the second axial surface 112(*a*).

The first shroud segment 102(*a*) also includes a first mounting projection 118(*a*) for coupling the first shroud segment 102(*a*) to, e.g., the casing 82 (FIG. 2). In the embodiment shown in FIGS. 3-5, the first mounting projection 118(*a*) includes a first mounting plate 120(*a*) extending outward along the radial direction R from the radially outer surface 106(*a*) of the first shroud segment 102(*a*). As shown in FIGS. 3-5, the first mounting plate 120(*a*) is spaced apart along the circumferential direction C from the first and the second circumferential surfaces 112(*a*), 114(*a*). In other embodiments, the first mounting plate 120(*a*) may extend to (i.e., be circumferentially aligned with) the first and the second circumferential surfaces 112(*a*), 114(*a*). A pair of hangers 122(*a*) extends radially outwardly from the first mounting plate 120(*a*) and couples to the casing 82 or other component of the turbofan 10. Nevertheless, the first shroud segment 102(*a*) may include any suitable mounting projection 118(*a*).

FIGS. 3-5 also illustrate the various features of the second and third shroud segments 102(*b*), 102(*c*). Referring specifically to the second shroud segment 102(*b*), the second shroud segment 102(*b*) includes a radially outer surface 106(*b*) and a radially inner surface 104(*b*) spaced apart from the radially outer surface 106(*b*). The radially inner surface 104(*b*) may be curved or planar in the circumferential direction C. The second shroud segment 102(*b*) also includes a first axial surface 108(*b*) and a second axial surface 110(*b*) spaced apart from the first circumferential surface 108(*a*). Furthermore, the second shroud segment 102(*b*) includes a first circumferential surface 112(*b*) and a second circumferential surface 114(*b*) spaced apart from the second axial surface 112(*b*).

The second shroud segment 102(*b*) also includes a second mounting projection 118(*b*) for coupling the second shroud segment 102(*b*) to, e.g., the casing 82. In the embodiment shown in FIGS. 3-5, the second mounting projection 118(*b*) includes a second mounting plate 120(*b*) extending radially outward from the radially outer surface 106(*b*) of the second shroud segment 102(*b*). As shown in FIGS. 3-5, the second mounting plate 120(*b*) is spaced apart along the circumferential direction C from the first and the second circumferential surfaces 112(*b*), 114(*b*). In other embodiments, the first mounting plate 120(*b*) may extend to (i.e., be circumferentially aligned with) the first and the second circumferential surfaces 112(*b*), 114(*b*). A pair of hangers 122(*b*) extends radially outwardly from the second mounting plate 120(*b*) and couple to the casing 82 or other component of the turbofan 10. Nevertheless, the second shroud segment 102(*b*) may include any suitable mounting projection 118(*b*).

Furthermore, as is also illustrated in FIGS. 3-5, the third shroud segment 102(*c*) includes the same or similar components as the first and the second shroud segments 102(*a*), 102(*b*). Similar numbering of the various components of the third shroud segment 102(*c*) may refer to the similarly numbered, previously described components of the first and the second shroud segments 102(*a*), 102(*b*).

As shown in FIG. 3, the shroud segment 102(b) includes an axial length 158. Although not shown, the first and third shroud segment 102(a), 102(c) also includes the axial length 158.

The seal 124 reduces the amount of combustion gases 210 that escapes from the hot gas path 70 between the first, the second, and the third shroud segments 102(a), 102(b), 102(c). As mentioned above, the first, the second, and the third shroud segments 102(a), 102(b), 102(c) are spaced apart along the circumferential direction C by the gaps 116. The seal 124 may be planar and positioned on the radially outer surfaces 106(a), 106(b), 106(c) of the first, the second, and the third shroud segments 102(a), 102(b), 102(c). In this respect, the seal 124 bridges the gaps 116 between the first, the second, and the third shroud segments 102(a), 102(b), 102(c), thereby reducing the volume of combustion gases 210 that escape therebetween.

FIGS. 3-5 illustrate one embodiment of the seal 124, which includes a first seal portion 126, a second seal portion 128, and a third seal portion 130. The first, the second, and the third seal portions 126, 128, 130 are preferably integrally formed. The first seal portion 126 is positioned at least partially on the first and the third shroud segments 102(a), 102(c) and at least partially covers the gap 116 defined by the first and the third shroud segments 102(a), 102(c). Additionally, the second seal portion 128 is positioned at least partially on the first and the second shroud segments 102(a), 102(b), and at least partially covers the gap 116 defined between the first and second shroud segments 102(a), 102(b).

More particularly, the first seal portion 126 includes a first circumferential edge 132 and a second circumferential edge 134 spaced apart along the circumferential direction C from the first circumferential edge 132. Similarly, the second seal portion 126 includes a first circumferential edge 136 and a second circumferential edge 138 spaced apart along the circumferential direction C from the first circumferential edge 136. The third seal portion 130 includes a first axial edge 140 and a second axial edge 142 spaced apart along the axial direction A from the first axial edge 140. The first circumferential edge 132 of the first seal portion 126 is positioned circumferentially between the first and the second circumferential surfaces 112(c), 114(c) of the third shroud segment 102(c). The second circumferential edge 134 of the first seal portion 126 is positioned circumferentially between the first and the second circumferential surfaces 112(a), 114(a) of the first shroud segment 102(a). The first circumferential edge 136 of the second seal portion 128 is positioned circumferentially between the first and the second circumferential surfaces 112(b), 114(b) of the second shroud segment 102(b). The second circumferential edge 138 of the second seal portion 128 is positioned circumferentially between the first and the second circumferential surfaces 112(a), 114(a) of the first shroud segment 102(a).

The first and the second circumferential edges 132, 134, 136, 138 of the first and the second seal portions 126, 128 are all positioned in parallel planes. The first and the second axial edges 140, 142 of the third seal portion 130 are positioned in planes perpendicular to the planes in which the first and the second circumferential edges 132, 134, 136, 138 of the first and the second seal portions 126, 128 are positioned. In this respect, the first, the second, and the third seal portions 126, 128, 130 give the seal 124 a "U" shape in some embodiments. Nevertheless, the seal 124 may have any suitable configuration.

As mentioned above, the seal 124 is positioned on the radially outer surfaces 106(a), 106(b), 106(c) of the first, the second, and the third seal segments 102(a), 102(b), 102(c). As best illustrated in FIG. 5, the first circumferential surface 112(a) of the first shroud segment 102(a) is positioned circumferentially between the first and the second circumferential edges 132, 134 of the first seal portion 126. Furthermore, the second circumferential surface 114(a) of the first shroud segment 102(a) is positioned circumferentially between the first and the second circumferential edges 136, 138 of the second seal portion 128. Similarly, the first circumferential surface 112(b) of the second shroud segment 102(b) is positioned circumferentially between the first and the second circumferential edges 136, 138 of the second seal portion 126. The second circumferential surface 114(c) of the third shroud segment 102(c) is positioned circumferentially between the first and the second circumferential edges 132, 134 of the first seal portion 126. For the embodiments of FIGS. 3-5, the first mounting projection 118(a) is circumferentially positioned between the second circumferential edges 134, 138 of the first and the second seal portions 126, 128. In this respect, the second seal portion 128 is positioned between the first and the second mounting projections 118(a), 118(b).

In other exemplary embodiments, the first, the second, and/or the third mounting plates 120(a), 120(b), 120(c) extend to the first and the second circumferential surfaces 112(a), 112(b), 112(c), 114(a), 114(b), 114(c) of the first, the second, and/or the third shroud segments 102(a), 102(b), 102(c). In these embodiments, slots (not shown) may be formed in the first, the second, and/or the third mounting plates 120(a), 120(b), 120(c) to provide clearance for the first and the second seal portions 126, 128. Preferably, these slots extend axially through the entirety of the mounting plates 120(a), 120(b), 120(c). That is, the slots are open on both axial sides of the mounting plates 120(a), 120(b).

In the embodiment shown in FIG. 5, the seal 124 is shorter in the axial direction A than the shroud segments 102(a), 102(b), 102(c). More specifically, the first seal portion includes an axial length 160 and the second seal portion 128 also includes an axial length 162. The axial lengths 160, 162 are the same in the embodiment shown in FIG. 5. Nevertheless, the axial length 160, 162 may be different. As mentioned above, the shroud segments 102(a), 102(b), 102(c) include an axial length 158. In this respect, the axial lengths 160, 162 of the first and the second seal portions 126, 128 are shorter than the axial lengths 158 of the shroud segments 102(a), 102(b), 102(c), but still cover a desired portion of the gaps 116. For example, the axial lengths 160, 162 of the first and the second seal portions 126, 128 may be at least about fifty percent as long, at least about seventy-five percent as long, or at least about ninety percent as long as the axial lengths of the shroud segments 102(a), 102(b). The axial lengths 160, 162 of the first and the second seal portions 126, 128 and the axial lengths of the shroud segments 102(a), 102(b), 102(c) may have other suitable relative lengths as well.

FIGS. 6 and 7 show different embodiments of the present disclosure having a different positioning of the seal 124 with respect to the adjacent stator vanes 64 or other adjacent hardware components. FIG. 6 shows one embodiment where the seal 124 is spaced apart along the axial direction A from the stator vanes 64. In this respect, the third seal portion 130 may include a wall 144 extending radially outwardly therefrom. The wall 144 may be integrally formed with the third seal portion 130 (e.g., by bending) or separately formed and attached to the third seal portion 130. The wall 144 may be spaced apart from the stator vanes 64 as shown in FIG. 6 or mated thereto. In FIG. 7, however, the first axial edge 140 of the third seal portion 130 extends axially past the first axial surfaces 108(a), 108(b) of the first and the second shroud segments 102(a), 102(b). That is, the first axial surfaces 108(a), 108(b) of the first and the second shroud segments 102(a), 102(b) are positioned axially between the first and the second axial edge 140, 142 of the third seal portion 130. In this respect, the third seal portion 130 may axially overlap with a portion of the stator vane 64.

FIG. 8 illustrates an alternate embodiment of the seal 124 in accordance with still another embodiment of the present disclosure. More specifically, the seal 124 additionally includes the first, the second, and the third portions 126, 128, 130, which are described in detail above. The seal 124 includes a fourth seal portion 146 having a first circumferential edge 150 and a second circumferential edge 152 spaced apart along the circumferential direction C from the first circumferential edge 150. The seal 124 also includes fifth seal portion 148 having a first axial surface 154 and a second axial surface 156 spaced apart along the axial direction A from the first axial surface 154. The fifth portion 148 couples the fourth portion 146 to the second and the third portions 128, 130. The first and the second circumferential edge 150, 152 of the fourth seal portion 146 are positioned in planes parallel to the planes in which the first and the second circumferential edges 132, 134, 136, 138 of the first and the second seal portions 126, 128 are positioned. The first and the second axial surfaces 154, 158 of the fifth seal portion 148 are positioned in planes parallel to the planes in which the first and the second axial edges 140, 142 of the third seal portion 130 are positioned. The first and the second axial surfaces 154, 158 of the fifth seal portion 148 are positioned in planes perpendicular to the planes in which the first and the second circumferential edges 132, 134, 136, 138 of the first and the second seal portions 126, 128 are positioned. In this respect, the first, the second, the third, the fourth, and the fifth seal portions 126, 128, 130, 146, 148 give the seal 124 a "W" shape in some embodiments. Nevertheless, the seal 124 may have any suitable configuration. Preferably, the first, the second, the third, the fourth, and the fifth seal portions 126, 128, 130, 146, 148 are planar and integrally formed.

The shroud segments 102(a), 102(b), 102(c), etc. in the shroud assembly 100 form a ring that circumferentially encloses one of the rows 56, 66 of turbine blades 58, 68 (FIG. 2). As mentioned above, the seals 124 cover the gaps 116 between each of the shroud segments 102(a), 102(b), 102(c), etc. In this respect, the shroud assembly may include as many seals 124 as is necessary to cover all the gaps 116 in the shroud assembly. In particular, each of the seals 124 is spaced apart from the adjacent seal 124 by one of the mounting projections. In the embodiment shown in FIGS. 3-5, for example, the seal 124 is positioned around the first mounting projection 118(a), thereby permitting the seal 124 to cover the gaps 116. A second seal (not shown) would be positioned around a fourth shroud segment (not shown) positioned adjacent to the second shroud segment 102(b), thereby covering a gap (not shown) between the second shroud segment 102(b) and the fourth shroud segment. In this respect, there is no need to place a seal around the second mounting projection 118(b) because both adjacent gaps 116 are already covered by the seal 124 and the second seal. As such, the mounting projection 118(b) circumferentially spaces the seal 124 and the second seal apart.

As mentioned above, FIG. 9 illustrates a further alternate embodiment of the seal 124. As depicted therein, the shroud segments 102(a), 102(b), 102(c), etc. are annularly arranged with respect to one another. That is, the shroud segments 102(a), 102(b), 102(c), etc. are curved in the circumferential direction C. In this respect, the seal 124 is also curved in the circumferential direction C so as to sit flush on the curved radially outer surfaces 106(a), 106(b), 106(c), etc. of the corresponding shroud segments 102(a), 102(b), 102(c), etc. Accordingly, the first and the second circumferential edges 132, 134, 136, 138 of the first and the second seal portions 126, 128 are positioned in planes oriented at an angle with respect to each other. The first and the second axial edges 140, 142 of the third seal portion 130 are curved.

The seals 124 may be constructed from a suitable nickel or cobalt alloys. Suitable nickel and cobalt alloys include RENE 41® Alloy produced by General Electric Co. of Schenectady, N.Y., USA; HAYNES® alloy 188 produced by Haynes International of Kokomo, Ind., USA; and UDIMET® alloy L-605 produced by Special Metal Corporation of New Hartford, N.Y., USA. Nevertheless, any suitable metallic material may be used.

In some embodiments, the seals 124 may be a ceramic matrix composite ("CMC") material. The CMC material used may be a continuous fiber reinforced CMC material. For example, suitable continuous fiber reinforced CMC materials may include CMC materials reinforced with continuous carbon fibers, oxide fibers, silicon carbide monofilament fibers, and other CMC materials including continuous fiber lay-ups and/or woven fiber preforms. In other embodiments, the CMC material used may be a discontinuous reinforced CMC material or unreinforced silicon carbide slurry matrix plies. For instance, suitable discontinuous reinforced CMC materials may include particulate, platelet, whisker, chopped fiber, weave, braid, in situ, and nanocomposite reinforced CMC materials.

The shroud assembly 100 is described above in the context of being positioned circumferentially around the rows 56, 66 of the turbine blades 58, 68 in the HP turbine 28. Nevertheless, the shroud assembly 100 may be positioned circumferentially around any row of turbine blades in the HP turbine 28. Moreover, the shroud assembly 100 may be positioned in the LP turbine 30, the LP compressor 22, or the HP compressor 24. Furthermore, the seal 124 may be used independently of the shroud assembly 100. For example, the seal 124 may be used in connection with the rows 52, 62 of stator vanes 54, 64.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shroud assembly for a gas turbine engine defining a circumferential direction C, comprising:
   a first shroud segment extending between a first end and a second end along the circumferential direction C;
   a second shroud segment spaced from the first shroud segment along the circumferential direction C and defining a gap with the first end of the first shroud segment;

a third shroud segment spaced from the first shroud segment along the circumferential direction C and defining a gap with the second end of the first shroud segment; and a seal comprising:
a first seal portion positioned at least partially on the first shroud segment and the third shroud segment and at least partially covering the gap defined by the first shroud segment and the third shroud segment;
a second seal portion positioned at least partially on the first shroud segment and the second shroud segment and at least partially covering the gap defined between the first shroud segment and the second shroud segment; and
a third seal portion extending between and coupling the first seal portion and the second seal portion; where the seal has a first end and a second end where the first end and second end are on different shroud segments.

2. The shroud assembly of claim 1, wherein the first shroud segment comprises a first circumferential surface at the first end and a second circumferential surface at the second end, wherein the first seal portion comprises a first circumferential edge and a second circumferential edge spaced apart along the circumferential direction C, and wherein the first circumferential surface of the first shroud segment is positioned circumferentially between the first circumferential edge of the first seal portion and the second circumferential edge of the first seal portion.

3. The shroud assembly of claim 1, wherein the second seal portion comprises a first circumferential edge and a second circumferential edge spaced apart along a circumferential direction, wherein the second circumferential surface of the first shroud segment is positioned circumferentially between the first circumferential edge of the second seal portion and the second circumferential edge of the second seal portion.

4. The shroud assembly of claim 1, wherein the first shroud segment comprises a radially inner surface and a radially outer surface spaced apart from the radially inner surface, and wherein the seal is positioned on the radially outer surface of the first shroud segment.

5. The shroud assembly of claim 4, further comprising:
a mounting projection extending radially outwardly from the radially outer surface of the first shroud segment, wherein the mounting projection is circumferentially positioned between a second circumferential edge of the first seal portion and the second circumferential edge of a second seal portion.

6. The shroud assembly of claim 1, wherein the seal comprises a wall projecting radially outwardly from the third seal portion.

7. The shroud assembly of claim 1, wherein the first shroud segment comprises a first axial surface and second axial surface spaced apart along an axial direction A from the first axial surface, wherein the third seal portion comprises a first axial surface and second axial surface spaced apart along the axial direction A from the first axial surface of the third seal portion, and wherein the first axial surface of the first shroud segment is positioned axially between the first axial surface of the third seal portion and the second axial surface of the third seal portion.

8. The shroud assembly of claim 7, wherein the second axial surface of the third seal portion is perpendicular to a second circumferential surface of the first seal portion and a second circumferential surface of the second seal portion.

9. The shroud assembly of claim 1, wherein the second shroud segment comprises a first circumferential surface and a second circumferential surface spaced along the circumferential direction, wherein a first circumferential edge of the second seal portion is positioned circumferentially between the first circumferential surface of the second shroud segment and the second circumferential surface of the second shroud segment, and wherein a second circumferential edge of the second seal portion is positioned circumferentially between a first circumferential surface of the first shroud segment and a second circumferential surface of the first shroud segment.

10. The shroud assembly of claim 9, wherein the seal further comprises:
a fourth seal portion comprising a first circumferential surface and a second circumferential surface spaced apart along the circumferential direction C from the first circumferential surface, wherein the second circumferential surface of the second shroud segment is positioned circumferentially between the first circumferential surface of the fourth seal portion and the second circumferential surface of the fourth seal portion; and
a fifth seal portion coupling the second seal portion and the fourth seal portion.

11. The shroud assembly of claim 1, wherein the third seal portion is formed integrally with the first seal portion and the second seal portion.

12. The shroud assembly of claim 1, wherein the seal is planar.

13. The shroud assembly of claim 1, wherein the first seal portion defines an axial length, wherein the second seal portion defines an axial length, wherein the first shroud segment defines an axial length, and wherein the axial length of the first seal portion and the axial length of the second seal portion are at least half of the axial length of the first shroud segment.

14. A gas turbine engine defining a circumferential direction C, comprising:
a compressor section;
a combustion section;
a turbine section, comprising:
a first shroud segment extending between a first end and a second end along the circumferential direction C;
a second shroud segment spaced from the first shroud segment along the circumferential direction C and defining a gap with the second end of the first shroud segment;
a third shroud segment spaced from the first shroud segment along the circumferential direction C and defining a gap with the first end of the first shroud segment; and
a seal comprising:
a first seal portion positioned at least partially on the first shroud segment and the third shroud segment and at least partially covering the gap defined by the first shroud segment and the third shroud segment;
a second seal portion positioned at least partially on the first shroud segment and second shroud segment and at least partially covering the gap defined between the first shroud segment and the second shroud segment; and
a third seal portion extending between and coupling the first seal portion and the second seal portion.

15. The gas turbine of claim 14, wherein the first shroud segment comprises a first circumferential surface at the first end and a second circumferential surface at the second end, wherein the second seal portion comprises a first circumferential edge and a second circumferential edge spaced apart along the circumferential direction C, and wherein the second circumferential surface of the first shroud segment and a first circumferential surface of the second shroud segment are positioned circumferentially between the first circumferential edge of the second seal portion and the second circumferential edge of the second seal portion.

16. The gas turbine engine of claim 15, wherein the first seal portion comprises a first circumferential edge and a second circumferential edge spaced apart along the circumferential direction C from the first circumferential edge, and wherein the first circumferential surface of the first shroud segment is positioned circumferentially between the first circumferential edge of the first seal portion and the second circumferential edge of the first seal portion.

17. The gas turbine engine of claim 16, further comprising:
 a first mounting projection extending radially outwardly from the first shroud segment, wherein the first mounting projection is circumferentially positioned between the second circumferential edge of the first seal portion and the second circumferential edge of the second seal portion; and
 a second mounting projection extending radially outwardly from the second shroud segment, wherein the first circumferential edge of the second seal portion and the second circumferential edge of the second seal portion are circumferentially positioned between the first mounting projection and the second mounting projection.

18. The gas turbine engine of claim 16, wherein the seal comprises:
 a fourth seal portion comprising a first circumferential edge and a second circumferential edge spaced apart along the circumferential direction C from the first circumferential edge, wherein the second circumferential surface of the second shroud segment is positioned circumferentially between the first circumferential edge of the fourth seal portion and the second circumferential edge of the fourth seal portion; and
 a fifth seal portion coupling the second seal portion and the fourth seal portion.

19. The gas turbine engine of claim 18, wherein the first circumferential edge of the first seal portion, the first circumferential edge of the second seal portion, and the first circumferential edge of the fourth seal portion are parallel.

20. The gas turbine engine of claim 18, wherein the third seal portion comprises a first axial edge and second axial edge spaced apart along an axial direction A from the first axial edge, wherein the fifth seal portion comprises a first axial edge and second axial edge spaced apart along an axial direction A from the first axial edge, and wherein the first axial edge of the third seal portion and the first axial edge of the fifth seal portion are coplanar.

* * * * *